United States Patent [19]

Marjoram

[11] 4,088,722
[45] May 9, 1978

[54] METHOD FOR MOLDING A BLOCK OF POLYURETHANE FOAM HAVING A FLAT UPPER SURFACE

[75] Inventor: John Ernest Marjoram, Great Missenden, England

[73] Assignee: Dunlop Limited, London, England

[21] Appl. No.: 592,994

[22] Filed: Jul. 3, 1975

Related U.S. Application Data

[63] Continuation of Ser. No. 471,969, May 21, 1974, abandoned.

[30] Foreign Application Priority Data

May 29, 1973 United Kingdom ............... 25430/73

[51] Int. Cl.² ............................................. B29D 27/04
[52] U.S. Cl. ................... 264/40.4; 264/40.2; 264/46.4; 264/51; 264/331; 264/338
[58] Field of Search ................. 264/54, 51, 46.4, 40.4, 264/40.2, 331, 338

[56] References Cited

U.S. PATENT DOCUMENTS

| | | | |
|---|---|---|---|
| 2,588,151 | 3/1952 | Nelson et al. | 264/51 X |
| 3,325,573 | 6/1967 | Boon et al. | 264/54 |
| 3,325,823 | 6/1967 | Boon | 264/54 X |
| 3,537,131 | 11/1970 | Kracht et al. | 425/4 R |
| 3,553,300 | 1/1971 | Buff | 264/54 X |
| 3,642,398 | 2/1972 | Rudgisch | 425/817 R X |
| 3,719,223 | 3/1973 | Jarema et al. | 264/54 X |
| 3,786,122 | 1/1974 | Berg | 264/54 |
| 3,840,628 | 10/1974 | Stastny et al. | 264/54 X |
| 3,840,629 | 10/1974 | Marjoram | 264/54 |
| 3,887,670 | 6/1975 | Porter | 264/54 X |

FOREIGN PATENT DOCUMENTS 664,318  1/1952  United Kingdom ................... 264/51

Primary Examiner—Philip Anderson
Attorney, Agent, or Firm—Stevens, Davis, Miller & Mosher

[57] ABSTRACT

A method is provided to make substantially flat-topped blocks of plastics foam, e.g. polyurethane, by a batch process. The foam-forming reaction mixture is dispensed into a cavity defined by a support and shaping members for the sides of the block. As the foaming commences the support is lowered so that the zone of contact between the shaping members and the foam remains constant. By this means the dome-shaped effect of free-foaming is avoided.

4 Claims, 3 Drawing Figures

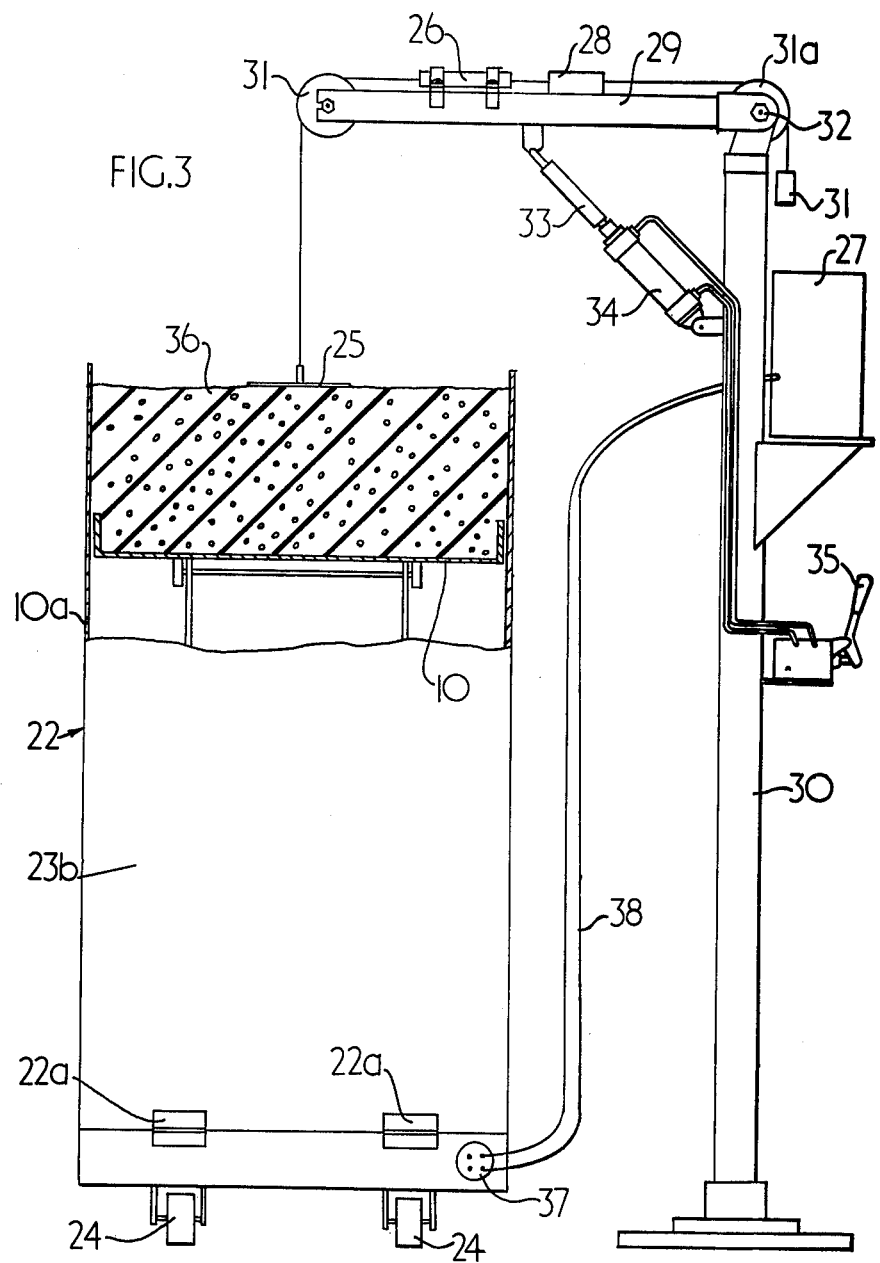

METHOD FOR MOLDING A BLOCK OF POLYURETHANE FOAM HAVING A FLAT UPPER SURFACE

This is a continuation of application Ser. No. 471,969 filed May 21, 1974, now abandoned.

This invention relates to a method for the production of foams, and in particular to the production of blocks of plastics foam having a flat upper surface. By "plastic foam" is meant in particular to embrace polyurethane foams whether flexible or rigid, although the invention is not intended to be limited thereto.

It is well known that if a foam-forming reaction mixture is allowed to foam in an open-topped container, the upper surface of the resulting foam will be curved or domed. This effect arises principally because of friction and/or adhesion between the side walls of the container and the expanding foam. The foam at the central area of the container is not in direct contact with the walls and expands to a greater extent than that in the peripheral regions resulting in a higher surface in the centre than at the edges. Clearly this domed effect can result in wastage since for many end-uses the curved upper portion of the foam will have to be cut off and discarded.

Various methods have been proposed to eliminate this domed effect and to achieve a substantially flat-topped foam but none has been altogether successful, particularly in the production of blocks of foam in batch mouldings as opposed to continuous production of lengths of foam on a moving conveyor. Prior proposals for batch processes include foaming in a container with a fixed, immovable lid so that the foam cannot acquire a curved surface. Another proposal involves attaching the lid to the sidewalls of the container and allowing both to be movable so that expansion of the foam causes the lid and sidewalls to move, whereby movement of the sidewalls cancels out the effect of friction and/or adhesion. A similar proposal allows the expanding foam to force the base of the container downwards. The first proposal has the disadvantage that the foam is physically constrained by the lid which may result in stresses in the finished foam and variations of density in the foam. Moreover, it may be very difficult to gauge the precise height at which the lid should be fixed above any particular foaming mixture. The latter two proposals also have disadvantages in that the foam has to press the lid or base and hence the sidewalls into motion while it is still in a deformable, unset condition. Thus the expansion force of the foam is used to produce the motion. This results in considerable undesirable densification of the foam in the areas in contact with lid and/or base of the containers and variations in density throughout the foam structure. This leads to undesirable quantities of scrap foam for many end uses, particularly mattresses and cushions and may even render the process economically unviable.

In one aspect the present invention provides a method of producing a moulding of plastics foam having a substantially flat upper surface, which comprises depositing a foam-forming reaction mixture on a support, providing shaping members to give the desired contours to the sides of the moulding, and when the reaction mixture begins to foam lowering the support to effect relative movement between the support and the shaping members at a speed such that the zone of contact between the upper surface of the foam and the shaping members does not move to any substantial amount, and stopping the relative movement when the foam ceases to increase in depth. Thus the expansion of the foam is not used as a force to move the support but a separate source of power is used. As indicated above the method is of particular use in the production of flexible or rigid polyurethane foam mouldings, and it is with reference to such use that the following description particularly relates.

In a further aspect the invention provides the utilization of apparatus for the production of a moulding of plastics foam having a substantially flat upper surface, which comprises a support on which can be deposited a foam-forming reaction mixture, foam-shaping members adapted to be positioned adjacent the support, the members and support defining a moulding cavity for the foam, and means to lower the support between the foam-shaping members to increase the volume of the moulding cavity.

The means to dispense the foam-forming reaction mixture may be any convenient means many of which are wellknown to the foaming art.

The number of shaping members and their configuration depends upon the shape required in the moulded foam. The shape may be, for example, of rectangular or circular cross-section or of any other desired cross-section. In the specific example described below there are four shaping members arranged to provide a moulding of rectangular cross-section. It will readily be appreciated that the number of shaping members can be more or less than four; for example, a single shaping member of circular or other ring configuration can be used if a moulding of rounded cross-section is required. However, if a single shaping member is used it will be appreciated that there may be difficulty in removing the product from the shaping member, although this might be achievable by use of paper or other flexible liners. Thus it will normally be more convenient to use two or more shaping members which together form the desired configuration rather than a single shaping member. It is indeed desirable, wherever two or more shaping members are used, to arrange for their easy removal from the moulded product. For example, they can be pivotally mounted on or hinged to a supporting base so that they can be detached from each other and swung outwardly to provide access to the moulding.

The support and the shaping members are preferably provided with moulding release means to obviate difficulty in separating them from the moulding and the consequent risk of tearing or breaking the moulding. The release means can, for example, take the form of paper or plastics sheet material which will not adhere to the support or shaping members and which can readily be stripped from the moulding; or it can take the form of a non-adherent coating of polytetrafluoroethylene (PTFE), or a substance of similarly low coefficient of friction, e.g. a mould release wax applied to the support and shaping members.

The means to lower the support may be any suitable mechanical and/or manual means. For example a D.C. motor with a conventional motor speed control device, e.g. a thyristor, may be used to control the speed of lowering of the support. Thus the rate of descent of the support may be substantially matched to the rate of rise of the foam so that the zone of contact between the upper surface of the foam and the shaping members does not change to any effective degree. If desired, means can be provided to very accurately match the rate of lowering of the support to the rate of rise of the foam. A preferred embodiment in which this is achieved is described below with reference to the drawings. Thus although the rate of rise of the foam may be a constantly varying one (which again will vary from one grade of foam to another and with changes in ambient conditions), the matching of this speed can be accomplished by the means described below:

The invention is illustrated by way of example only with reference to the accompanying drawings in which:

FIG. 3 is an end elevation of the apparatus of FIG. 1 in part section showing a control system in position during a foaming operation, the support having been lowered to a position intermediate its initial and final positions.

Figure 1:
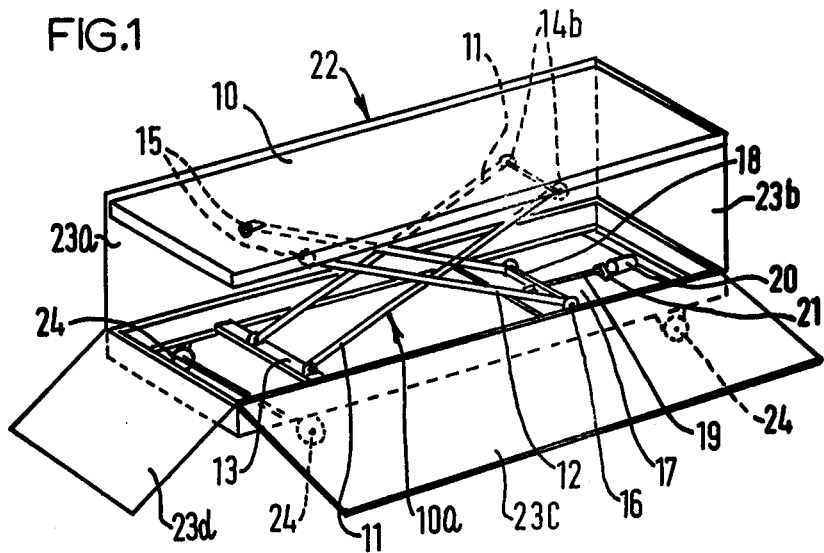
FIG. 1 is a side elevation of one form of moulding apparatus of the invention.

The apparatus of FIG. 1 comprises a support for the foam reactants in the form of a shallow tray 10. This tray is mounted on the arms 11,11 and 12,12 of a scissor-type lowering device. One of each pair of parallel arms 11,11 and 12,12 is pivotally attached at approximately the mid-point of its length to the mid-point of one of the other pair. Thus a pair of parallel, spaced-apart 'X'-shaped members are provided to support the bottom of the tray 10. The lower ends of arms 11 are pivotally attached to an immovable bar 13 positioned across the base of the moulding apparatus. The upper ends of arms 11 are provided with wheels or rollers which enable those ends to move freely relative to the exterior surface of the bottom of tray 10. Channels (not shown) are preferably provided on the underside of the tray in which the wheels or rollers can run. The upper ends of arms 12 are pivotally attached to fixed plates 15 on the under surface of tray 10. The lower ends of arms 12 are mounted on wheels or rollers 16 so that they can move freely in channel sections (again not shown) in the base 17 of the apparatus. A cross-rod 18 connects the two wheels 16. At the centre of cross-rod 18 is a threaded hole (not visible) through which passes an externally threaded bar 19. At one end bar 19 is coupled to an electric motor 20. e.g. a D.C. motor through a suitable conventional gearing mechanism indicated at 21.

The tray and lowering device are located in a mould box 22 whose side walls 23 ($a,b,c$ and $d$) are to act as the shaping members for the foam. The base of the box is shown having wheels 24 for ease of movement of the mould. The mould could equally well run on rails or other conventional means instead. Sidewalls 23c and 23d are shown in the open position in FIG. 1. The sidewalls are hinged to the base of box 22 by hinge 22a (see FIG. 3) so that they can be swung into the open position to give access to the finished product.

The internal surfaces of the tray 10 and the sidewalls 23 of the box 22 may be coated or lined with a mould-release type covering, e.g. P.T.F.E.

A rectangular block of rigid or flexible polyurethane foam can be moulded using the apparatus illustrated in FIG. 1 as follows.

A foam-forming urethane reaction mixture is obtained by very rapid and thorough mixing of ingredients and quickly fed into the support tray 10. The depth of the tray (for example, about two to four inches) is such that the correct amount of reaction mixture to provide the foam block required can easily be contained in the tray. Once the foam-forming reactions are under way the volume of the reaction mixture begins rapidly to increase, and if the tray were to be left in the uppermost position shown in the drawing the reaction mixture would soon produce a loaf-like foam mass (or spill over the top of the moulding apparatus). However, in accordance with the present invention as soon as the reaction mixture begins to increase in height the control means is operated so as gradually to lower the tray within the mould box 22. The rate of lowering is adjusted so that the upper level of the foaming mass remains constant. Thus, in effect, the reaction mixture "foams downwardly" and the uppermost level of the foaming mass does not move with respect to the sides 23 of the box. The tray is moved downwardly until the depth of the foam ceases to increase at which time movement of the tray is stopped. The polyurethane block which has been formed inside the box is then allowed to cure — at least so far as to obtain a product which can be handled satisfactorily. The retention means holding the box sides in position are then removed and the sides swung outwardly to permit the polyurethane block to be removed.

Figure 2:
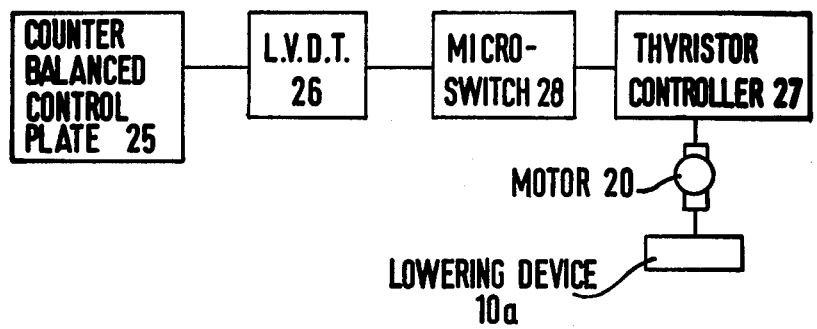
FIG. 2 is a block diagram of a control system to operate the lowering of a support used in the invention.

FIGS. 2 and 3 illustrate a control mechanism for the lowering device of FIG. 1. The mechanism comprises a control plate 25 which can be positioned to lie on top of the foam-forming reaction mixture when the latter has been charged into tray 10. Plate 25 is connected via a linear variable differential transformer 26 (L.V.D.T.), i.e. a form of frictionless potentiometer, and a thyristor controller 27 to the D.C. motor 20 (not shown in FIG. 3). A microswitch 28 is also included in the circuit.

Plate 25 is suspended over the moulding apparatus by means of an arm 29 mounted on a support column 30. The arm is pivoted at its junction 32 with the support column so that it can be raised clear of the mould when not in operation. Arm 29 is shown to be raised by piston 33 operated by air cylinder 34, the control lever 35 being mounted on support column 30. Clearly many alternative mechanical equivalents could be used. A counterbalancing weight 31 is connected via pulleys 31a on arm 29 to the plate 25 so that the latter is suspended substantially in equilibrium but to have an effective weight of a grammme or two. Any movement upwards by the plate under the action of rising foam 36 triggers the microswitch 28 and starts the motor 20. The motor will run as long as the plate has been moved from its equilibrium position and will be stopped automatically when the plate has returned to its equilibrium position. The speed at which the motor runs is governed by the amount of movement of the plate as this movement (rise or fall) is automatically detected by the L.V.D.T. which feeds the appropriate speed instructions to the thyristor controller. Because plate 25 is balanced to have a definite though small weight, it will tend to fall if the motor should lower the tray slightly ahead of the rate of rise of the foam. Thus the mechanism would then work in reverse to bring the plate back up to its equilibrium position. Thus the lowering system automatically compensates itself.

Referring again to FIG. 1, running of the motor turns threaded bar 19 which causes cross-rod 18 to move along the bar. Thus as the foam and hence plate 25 in tray 10 rises, the motor is switched on and will turn bar 19 to move rod 18 towards the motor. Arms 12 of the lowering device will be pulled, and will run on their wheels 16, toward the motor and hence the upper ends of arms 11 and 12 will be lowered allowing the tray 10 to descend. The tray will descend until no further rise in the foam occurs when the control plate will have returned to and remain in its equilibrium position. In this position the microswitch is operated to break the circuit and the motor will be switched off automatically. The foam block formed can then be allowed to set and sidewalls 23 are swung open so that the moulded foam block can be removed.

If desired a sheet of paper or foil or the like may be placed between the plate 25 and the foam. This keeps the plate clean. Also if the sheet is of larger surface area than the plate it results in a smoother surface finish on the covered part of the surface of the block. Preferably, the sheet material should be light in weight to avoid the densification problem discussed above. It has been found that the sheet can with advantage be a thin sheet of rigid foam of substantially the same density as that of the eventual foam block being formed. For example, a sheet of foam of about ¼ to ¾ inch in thickness has been found satisfactory.

It will be appreciated that many alternative means of lowering the tray and controller the speed of descent of the tray will be apparent to those skilled in the art and the present specification is not intended to be limited to the above specified means. For example, a piston controlled by a hydraulic cylinder could be employed instead of the D.C. motor and threaded bar. A photoelectric cell could be used to detect movement of the foam surface instead of the control plate. It is even possible to lower the tray manually, e.g. by a simple winding device. The rate of rise of the foam can then be judged visually and the rate of lowering adjusted accordingly. It may be possible to obtain reasonably satisfactory, substantially flat-topped blocks in this manner.

A series of mould boxes can be conveyed, e.g. on rails or wheels, so that they pass the lowering device in turn and can have a flat-topped foam block formed in each one successively. The thyristor controller can be connected to the motor in each box in turn, for example, by a multiple pin plug and socket 37 and a flying lead 38 (FIG. 3). Thus a continuous batch of individual foam blocks can be made.

The method of the invention has important advantages over continuous methods of producing long lengths of foam block. Many methods have been proposed for the continuous production of lengths of foam in block form. They generally have a discharge station where the foam reaction mixture is dispersed into a continuous longitudinal mould which is drawn away from the discharge station by a conveying system. Although having obvious advantages of continuous production, such systems are less flexible than the present invention in that a quite long length of foam block of any particular formulation needs to be made to render such a continuous process economic. Thus if a small number of foam blocks are required, continuous processes may not be economically viable. Similarly if a number of blocks of differing sizes or formulations are required, the continuous processes may again not be very economical. However, such products can be satisfactorily and economically made using the batch process of this invention.

Having now described my invention, what I claim is:

1. A method of moulding a discrete block of polyurethane foam having a substantially flat upper surface comprising:
   depositing a polyurethane foam-forming reaction mixture on a shallow tray support positioned within shaping members and movable relative thereto,
   applying a contact means to the top surface of said mixture to detect upward movement of said surface as a result of foam formation,
   foaming said mixture,
   detecting the upward movement of the top surface of said mixture during foaming and generating a signal to a power means to move said support downwardly inside of said shaping members at a rate corresponding to the rate of expansion of the mixture so that the sides of the mixture maintain sliding contact with the shaping members and are given the contour of the shaping members and maintaining said control means and the top surface of said mixture in a substantially unmovable position, said downward movement of said support stopping when said mixture ceases to expand.

2. The method of claim 1 in which said control means include a counterbalanced plate positioned above said support.

3. The method of claim 2 in which a thin sheet of material is placed between the counterbalanced plate and the upper surface of the foaming mixture, whereby the movement of said supper surface is detected and transmitted to said control means.

4. The method of claim 2 in which said thin sheet of material comprises a rigid foam having substantially the same density as that of the foam block being moulded.

* * * * *